US012752695B2

(12) United States Patent
Scott

(10) Patent No.: US 12,752,695 B2
(45) Date of Patent: Oct. 6, 2026

(54) HYDRAULIC SECUREMENT DEVICE

(71) Applicant: Tramec Sloan, LLC, Shawnee, KS (US)

(72) Inventor: Christian A. Scott, Muskegon, MI (US)

(73) Assignee: Tramec L.L.C., Shawnee, KS (US)

( * ) Notice: Subject to any disclaimer, the term of this patent is extended or adjusted under 35 U.S.C. 154(b) by 502 days.

(21) Appl. No.: 18/349,592

(22) Filed: Jul. 10, 2023

(65) Prior Publication Data

US 2025/0018854 A1 Jan. 16, 2025

(51) Int. Cl.

*B60P 7/15* (2006.01)
*B66F 3/40* (2006.01)
*B66F 3/42* (2006.01)

(52) U.S. Cl.

CPC . *B60P 7/15* (2013.01); *B66F 3/40* (2013.01); *B66F 3/42* (2013.01)

(58) Field of Classification Search

CPC ...... B66F 3/42; B66F 3/40; B66F 3/38; B60P 7/15; B60P 7/135; B60P 7/0892; B60S 9/12

See application file for complete search history.

(56) References Cited

U.S. PATENT DOCUMENTS

| | | | | |
|---|---|---|---|---|
| 5,912,187 | A | 6/1999 | Blasko et al. | |
| 6,375,400 | B1 | 4/2002 | Berg | |
| 6,378,843 | B1 * | 4/2002 | Hong | B66F 3/42 254/DIG. 16 |
| 2006/0088394 | A1 | 4/2006 | Bruun | |
| 2013/0105658 | A1 * | 5/2013 | Hisel | B66F 3/25 248/352 |

FOREIGN PATENT DOCUMENTS

| | | | |
|---|---|---|---|
| CA | 2080632 | A1 | 4/1993 |
| EP | 1079989 | A1 | 3/2001 |

* cited by examiner

*Primary Examiner* — Christopher J. Besler
(74) *Attorney, Agent, or Firm* — McGarry Bair PC

(57) ABSTRACT

An apparatus and method for a securement device having a primary bar and at least one extension bar located within the primary bar. The securement device further including a rod coupled to the at least one extension bar. A pump body including a piston and a check valve. The pump body coupled to the extension bar and the piston moveable within the pump body.

14 Claims, 11 Drawing Sheets

HYDRAULIC SECUREMENT DEVICE

TECHNICAL FIELD

The disclosure generally relates to a hydraulic securement device, and more specifically to a hydraulic securement device for heavy-duty transportation.

BACKGROUND

Transporting heavy duty objects via a box truck or a trailer requires securing of the cargo to ensure safety during loading, transporting, and unloading. Load securement bars are typically utilized to secure large loads in the industry. Some load securement bars are mechanical and include a ratcheting system to apply pressure on the box truck or trailer walls when used horizontally, or on the ceiling and floor when used vertically.

BRIEF DESCRIPTION OF THE DRAWINGS

A full and enabling disclosure, including the best mode thereof, directed to one of ordinary skill in the art, is set forth in the specification, which refers to the appended figures in which.

DETAILED DESCRIPTION

Figure 1:
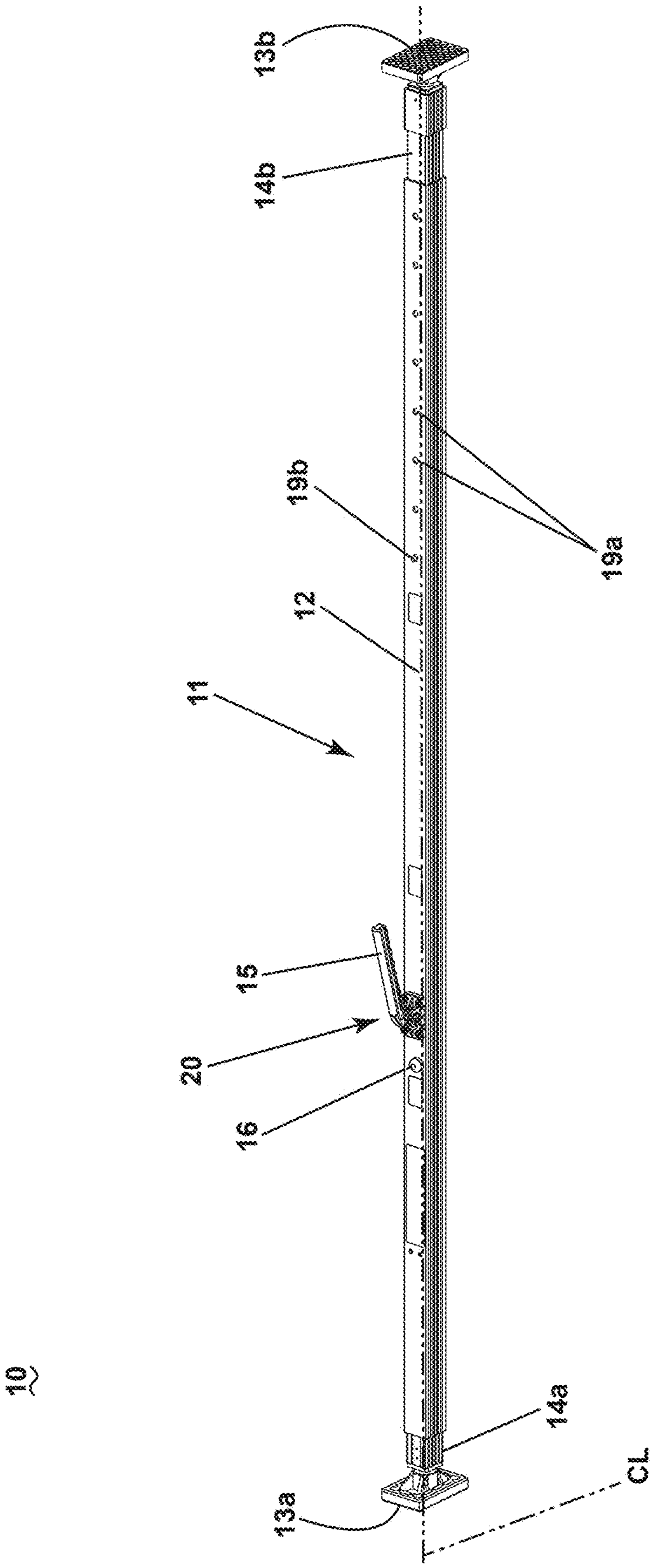
FIG. 1 is a perspective view of a securement device according to an aspect of the disclosure herein.

Aspects of the disclosure described herein are directed to a hydraulic securement device. More specifically a hydraulic load bar for securing cargo during transport in a box truck or trailer. For purposes of illustration, the present disclosure will be described with respect to a trailer. It will be understood, however, that aspects of the disclosure described herein are not so limited and may have general applicability within other mobile applications and non-mobile industrial, commercial, and residential applications.

Typically, load bars include ratcheting systems. There are a few inherent problems with the ratcheting style of load bar. First, there is nothing to prevent too much pressure from being applied to the walls or floor and ceiling, which can result in damage to the trailer. When used in a refrigerated trailer, too much pressure can break the insulation of the trailer, resulting in a compromised insulation rating and costly repairs. Second, in a dry freight (non-refrigerated) application there is a lot of flexibility in the walls as the truck or trailer is in transit. This flexibility can cause movement of the load bar during transport and in some cases complete movement out of a loaded position.

In order to provide effective securing of heavy-duty loads during transport it is desired to consider the pressure exerted by the load bar and the flexibility in the walls of the trailer. The hydraulic securement device described herein includes a hydraulic pump and a pressure relief control valve (PRCV) within the hydraulic pump that ensures a desired amount of pressure, and not too much pressure to the trailer walls or ceiling and floor. Additionally, a spring is included in the hydraulic securement device. This allows the load bar to compensate for any flexion in the trailer. The hydraulic securement device described herein is a hydraulic load bar that secures cargo from sliding and/or moving during loading, transit, and unloading.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are used only for identification purposes to aid the reader's understanding of the present disclosure, and should not be construed as limiting on an embodiment, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 illustrates a securement device 10 in the form of a hydraulic load bar 11. The hydraulic load bar 11 includes a primary bar 12 extending linearly along a centerline (denoted "CL") between a first foot 13*a* and a second foot 13*b*. A first extension bar 14*a* is mounted to the first foot 13*a* and a second extension bar 14*b* is mounted to the second foot 13*b*. Each of the first and second extension bars 14*a*, 14*b* are located within the primary bar 12 and are adjustable. In other words, the first and second extension bars 14*a*, 14*b* are slidably received within the primary bar 12. More specifically, the primary bar 12 includes multiple holes 19*a*, by way of non-limiting example eight holes as illustrated, such that the second extension bar 14*b* is manually adjustable via a push-in button 19*b* received in one hole of multiple holes 19*a*.

The hydraulic load bar 11 includes a pump assembly 20. A handle 15 is mounted to the primary bar 12. A button 16 is located proximate the handle 15. The handle 15 and button 16 defining at least a portion of the pump assembly 20.

For installation, the securement device 10 is adjusted to fit longitudinally or laterally between surfaces first by manually adjusting the second extension bar 14*b* to fit the space between the surfaces. Then the pump assembly 20 is utilized to extend the first extension bar 14*a* for a snug fit between the surfaces.

Figure 2:
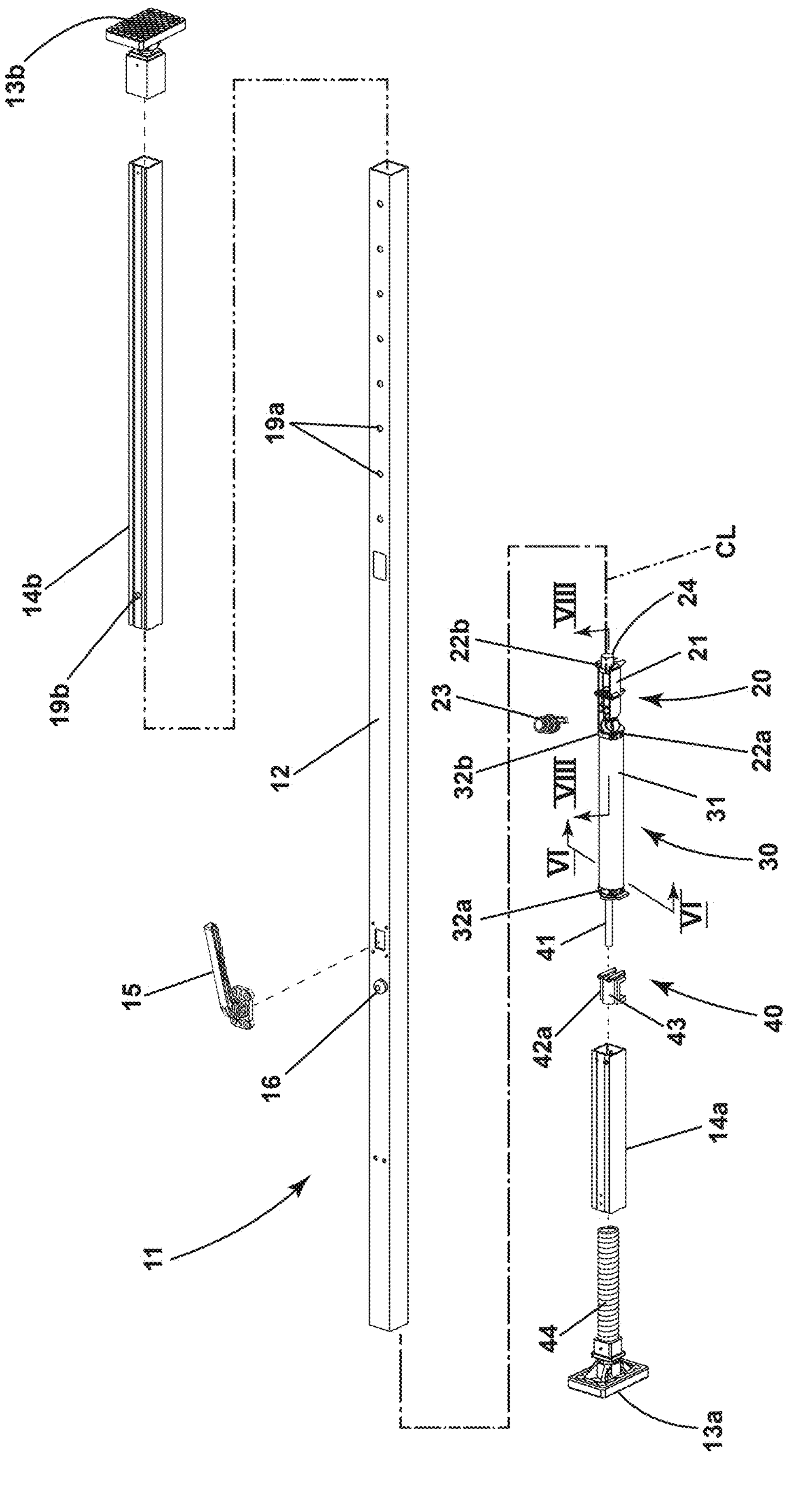
FIG. 2 is an exploded view of the securement device from FIG. 1. including a pump body.

FIG. 2 is an exploded view of the securement device 10. The pump assembly 20 includes a pump body 21 located within the primary bar 12. The pump body 21 extends between a first end 22*a* and a second end 22*b*. A pressure release valve (PRV) 23 is housed within the pump body 21 proximate the first end 22*a*. A piston cap 24 closes onto the second end 22*b*.

A bladder assembly 30 includes a bladder 31 having a cylindrical shape extending along the centerline CL. The bladder assembly extends between a first end 32*a* and a second end 32*b*. The second end 32*b* of the bladder assembly 30 is coupled the first end 22*a* of the pump body 21.

A rod assembly 40 includes a rod 41 that extends from a first end 42*a* and at least partially into the bladder assembly 30. A spring damper 43 is mounted to the first end 42*a* of the rod 41. A compression spring 44 extends between the first end 42*a* of the rod 41 and the first foot 13*a*.

Figure 3:
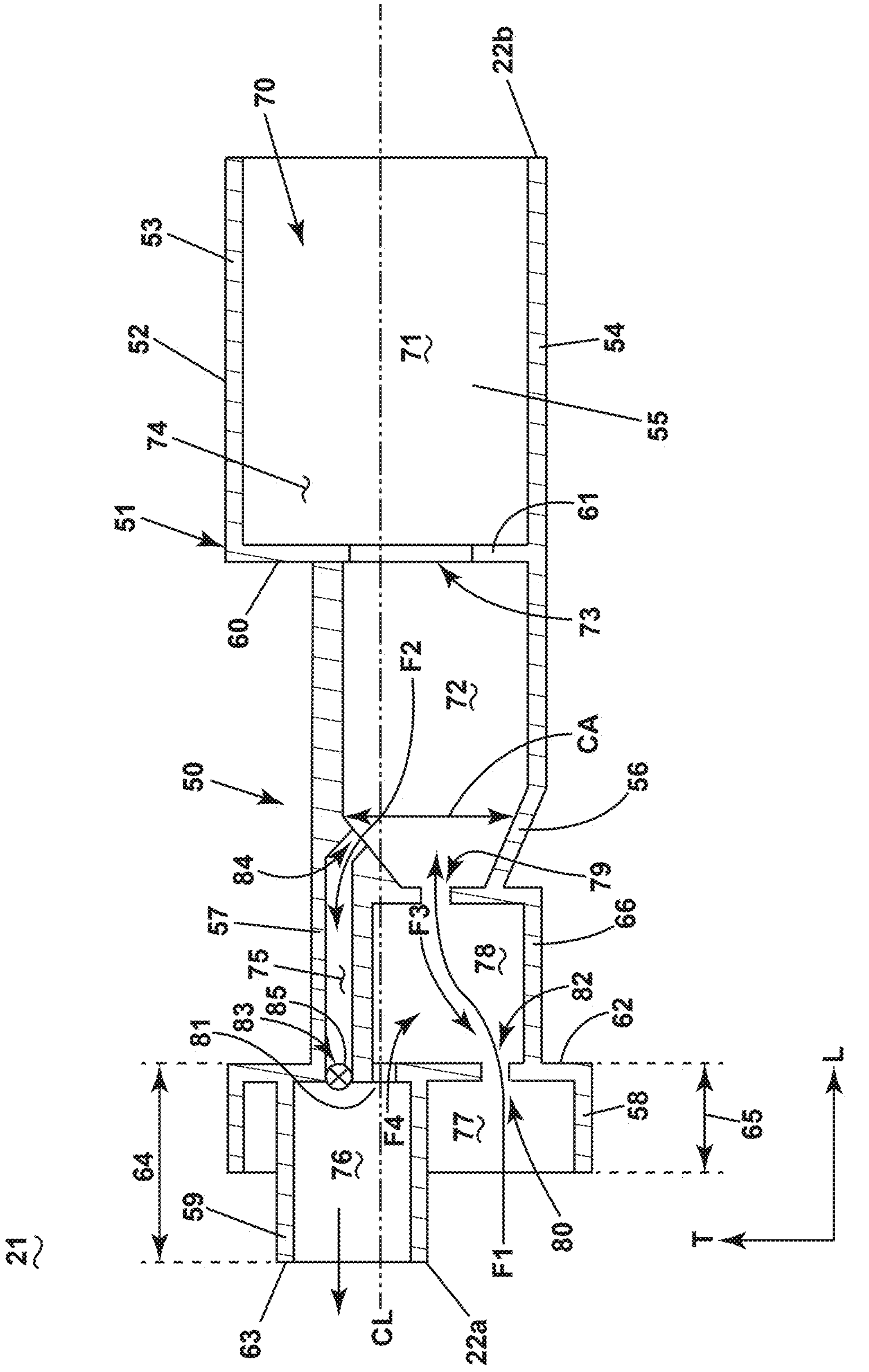
FIG. 3 is a schematic cross-sectional view of the pump body from FIG. 2 according to an aspect of the disclosure herein.

FIG. 3 is a schematic cross-sectional view of the pump body 21 according to an aspect of the disclosure herein. The pump body 21 is formed as a single unit 50. The pump body 21 can be formed by injection molding to produce the single unit 50. The pump body 21 extends between the first end 22*a* of the pump body 21 and the second end 22*b* of the pump body 21 to define a longitudinal direction (denoted "L"). The pump body 21 can have a centerline (denoted "CL") extending in the longitudinal direction and through a center mass of the pump body 21. As is illustrated, the pump body 21 is not necessarily symmetrical about the centerline CL. A transverse direction (denoted "T") extends perpendicular to the longitudinal direction L.

The pump body 21 includes multiple walls 51. The multiple walls 51 divide the pump body 21 into a set of chambers 70. The multiple walls 51 include a set of longitudinal walls 52 extending in the longitudinal direction L and parallel to the centerline CL. The set of longitudinal walls 52 include a first wall 53 and a second wall 54 spaced from the first wall 53. A base wall 55, also included in the set of longitudinal walls 52, connects the first wall 53 to the second wall 54.

The multiple walls 51 further include a set of transverse walls 60 extending in the transverse direction and perpendicular to the centerline CL. The set of transverse walls 60 includes a third wall 61 extending between the first wall 53 and the second wall 54. Together the first wall 53, second wall 54, third wall 61, and the base wall 55 define a piston housing 71 as one of the set of chambers 70.

A transfer wall 56, also part of the set of longitudinal walls 52, extends from the third wall 61 to define a transfer conduit 72 as another one of the set of chambers 70. A first transfer opening 73 is located in the third wall 61 and fluidly connects the transfer conduit 72 to the piston housing 71. Together the piston housing 71 and the transfer conduit 72 define a piston chamber 74.

A check valve wall 57, another wall in the set of longitudinal walls 52, extends from the transfer wall 56 to define a check valve conduit 75. The check valve conduit 75 is another chamber in the set of chambers 70.

An end wall 62, also included in the set of transverse walls 60, extends perpendicular to the check valve wall 57. An exterior wall 58 surrounding an interior wall 59 are included in the set of longitudinal walls 52 and extend from the end wall 62. The interior wall 59 extends in the longitudinal direction from the end wall 62 to a distal end 63 to define the first end 22*a* of the pump body 21. The interior wall 59 defines a first length 64 and the exterior wall 58 defines a second length 65 less than the first length 64. The interior wall 59 together with the end wall 62 defines an outlet reservoir 76. An inlet reservoir 77 is defined at least in part by the exterior wall 58, the interior wall 59, and the end wall 62. The set of chambers 70 includes the outlet reservoir 76 and the inlet reservoir 77.

An intermediate wall 66 extends transversely and longitudinally and intersects with the end wall 62. The intermediate wall 66 defines an intermediate chamber 78. A second transfer opening 79 extends through the intermediate wall 66 from the intermediate chamber 78 to the transfer conduit 72. The intermediate wall 66 can extend radially from the centerline CL. The intermediate chamber 78 and the piston chamber 74 are fluidly connected to each other via the second transfer opening. The set of chambers 70 further includes the intermediate chamber 78.

A set of apertures 80 are located in the end wall 62 and fluidly couple the intermediate chamber 78 to the inlet reservoir 77 and to the outlet reservoir 76. The set of apertures 80 includes a bypass aperture 81 extending through the end wall 62 between the intermediate chamber 78 and the outlet reservoir 76. Further, an inlet aperture 82 extends through the end wall 62 between the intermediate chamber 78 and the inlet reservoir 77.

A first opening 83 extends through the end wall 62 from the outlet reservoir 76 to the check valve conduit 75. A second opening 84 extends through the multiple walls 51, by way of non-limiting example the transfer wall 56, to fluidly couple the check valve conduit 75 to the transfer conduit 72. A check valve 85 is located in the first opening 83 to selectively fluidly couple the outlet reservoir 76 to the check valve conduit 75 and the transfer conduit 72.

The transfer wall 56 can define a cross-sectional area (denoted "CA") of the transfer conduit 72. In one aspect of the disclosure herein, the cross-sectional area CA can decrease in a direction from the first transfer opening 73 toward the second transfer opening 79.

A first flow path (denoted "F1") extends from the inlet reservoir 77 through the inlet aperture 82 into the intermediate chamber 78 through the second transfer opening 79 and into the transfer conduit 72.

A second flow path (denoted "F2") extends from the transfer conduit 72 through the second opening 84 into the check valve conduit 75 and through the first opening 83 into the outlet reservoir 76.

A third flow path (denoted "F3") extends from the intermediate chamber 78 through the inlet aperture 82 and into the inlet reservoir 77.

A fourth flow path (denoted "F4") extends from the outlet reservoir 76 through the bypass aperture 81 into intermediate chamber 78.

Figure 4:
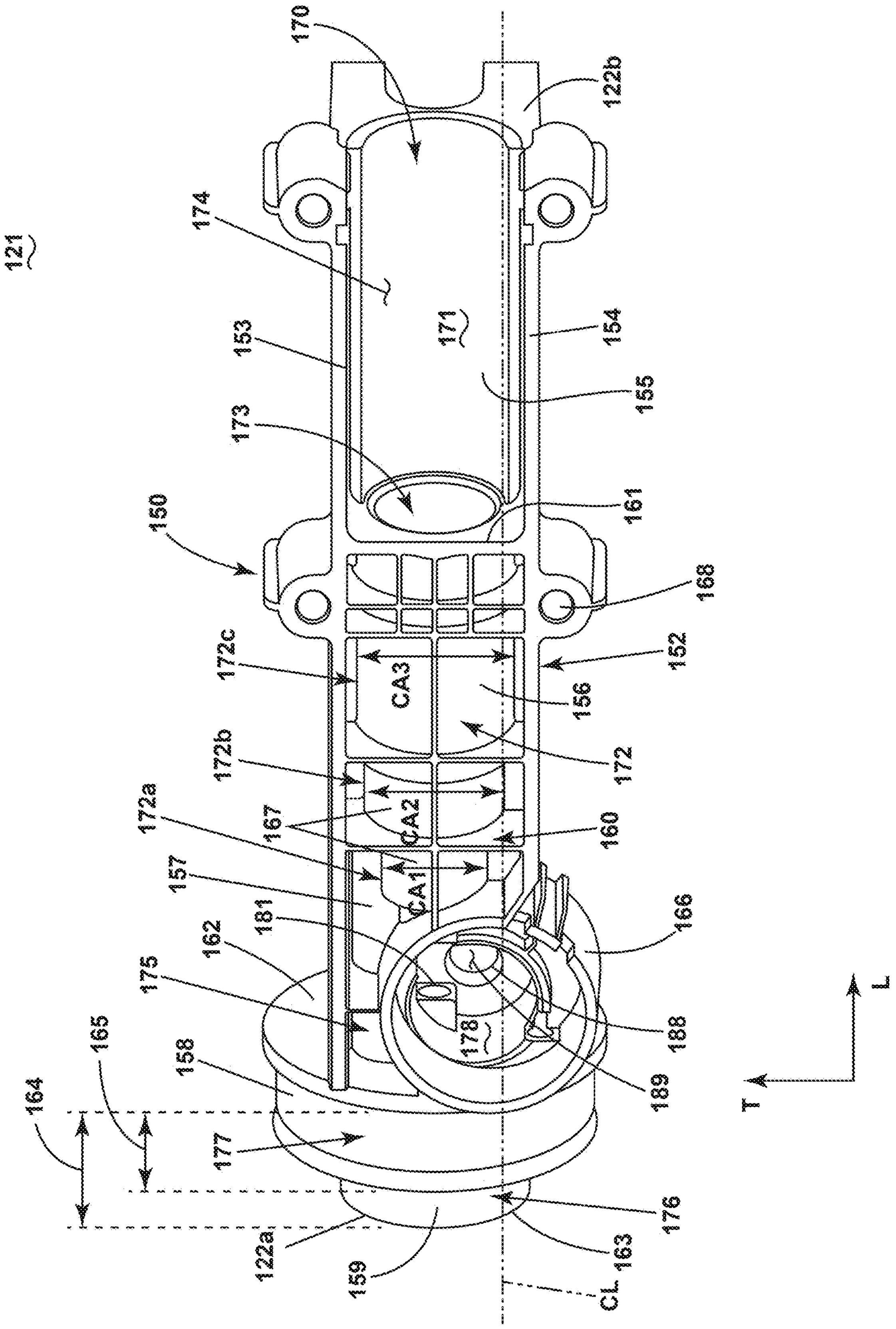
FIG. 4 is a perspective view of a pump body for the securement device of FIG. 1 according to another aspect of the disclosure herein.

FIG. 4 is a perspective view of a pump body 121 according to another aspect of the disclosure herein. The pump body 121 is similar to the pump body 21 of FIG. 3 therefore, like parts will be identified with like numerals increased by 100, with it being understood that the description of the like parts of the pump body 21 applies to the pump body 121, except where noted. The pump body 121 can be part of the pump assembly 20 illustrated in FIG. 2.

The pump body 121 is an injection molded single unit 150 defining a centerline CL extending in the longitudinal direction L and through a center of mass of the pump body 121. The pump body 121 extends in the longitudinal direction L between a first end 122*a* and a second end 122*b*. An intermediate wall 166 extends radially (generally out of the page) with respect to the centerline CL proximate a first end 122*a* of the pump body 121. The intermediate wall 166 defines an intermediate chamber 178. A spring hole 188 defines a bottom 189 of the intermediate chamber 178.

A set of longitudinal walls 152 extend in the longitudinal direction L parallel to the centerline L. The set of longitudinal walls 152 includes a first wall 153, a second wall 154, a base wall 155, a transfer wall 156, a check valve wall 157, and exterior wall 158 and an interior wall 159.

A set of transverse walls 160 extend in the transverse direction T perpendicular to the centerline CL. The set of transverse walls 160 include a third wall 161 and an end wall 162. The set of transverse walls 160 intersect the set of longitudinal walls 152 and separate the pump body 121 into a set of chambers 170. The set of chambers 170 includes a piston housing 171, a transfer conduit 172, a piston chamber 174, a check valve conduit 175, an outlet reservoir 176, the inlet reservoir 177, and the intermediate chamber 178. The piston chamber 174 includes the piston housing 171 and the transfer conduit 172.

Figure 7:
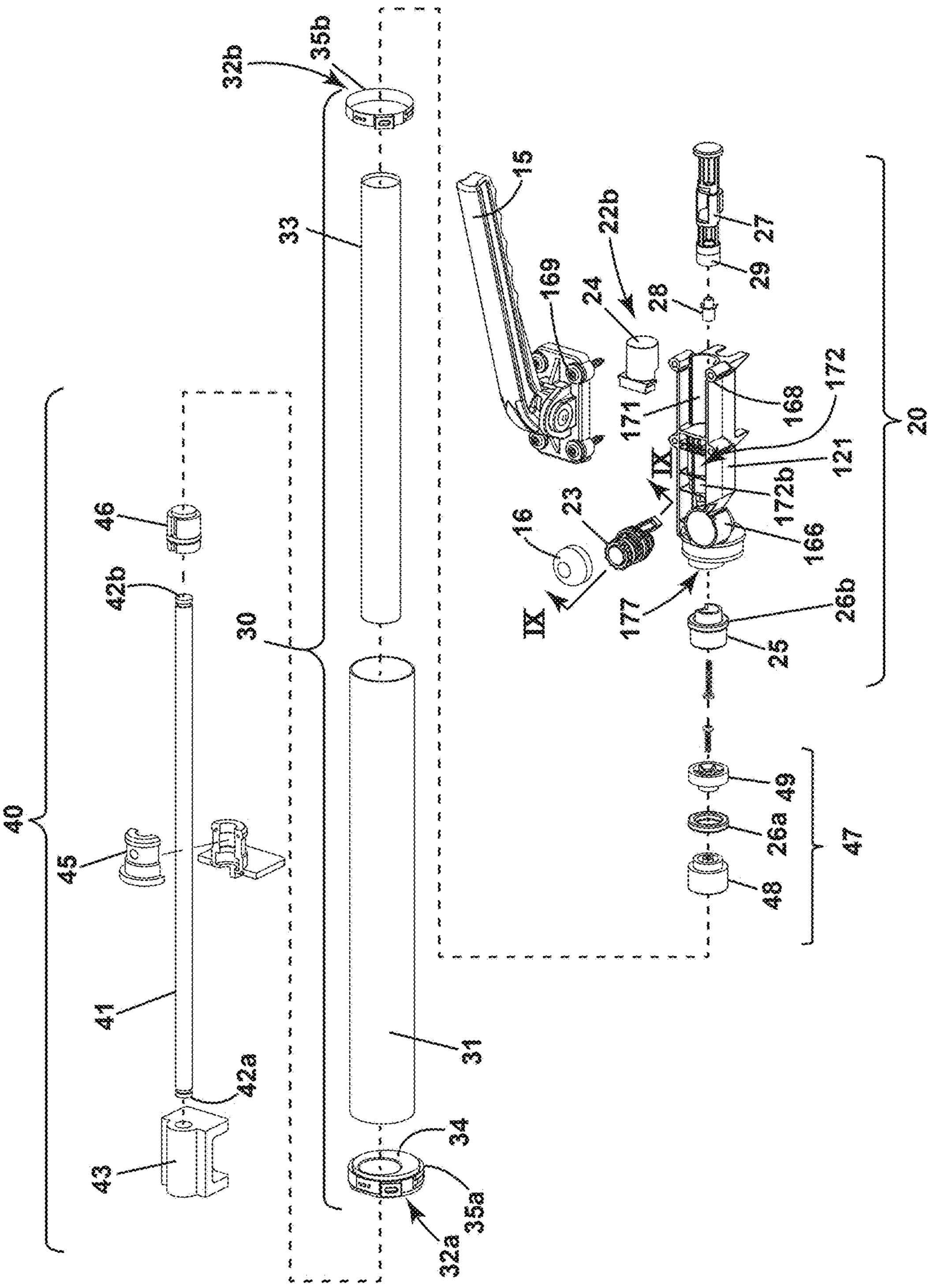
FIG. 7 is an exploded view of a pump assembly, a bladder assembly, and a rod assembly suitable for the securement device of FIG. 1.

The first wall 153, second wall 154, base wall 155 and third wall 161 together define the piston housing 171. The base wall 155 can be curved. The piston housing 171 can be open on one side to receive a piston 27 (FIG. 7)

The transfer wall 156 defines the transfer conduit 172 extending from the third wall 161 to the intermediate wall 166. The third wall 161 includes a first transfer opening 173 that fluidly connects the piston housing 171 to the transfer conduit 172 to define the piston chamber 174. The transfer wall 156 can be multiple cylindrical walls 167 defining a first section **172*a*, a second section 172*b*, and a third section 172*c* of the transfer conduit 172. Each section can have a different cross-sectional area, the first section 172*a* having a first cross-sectional area (denoted "CA1"), the second section 172*b* having a second cross-sectional area (denoted "CA2"), and the third section 172*c* having a third cross-sectional area (denoted "CA3"). The first section 172*a* can open to the intermediate chamber 178 through a second transfer opening 179 (not visible). The third section 172*c* can open to the piston housing 171 through the first transfer opening 173**. The third cross-sectional area CA3 is greater than the second cross-sectional area CA2, which is greater than the first cross-sectional area CA1 (CA3>CA2>CA1).

The interior wall 159 extends a first length 164 from the end wall 162 within the exterior wall 158 and to a distal end 163. The exterior wall 158 extends a second length 165 less than the first length 164 from the end wall 162 toward the first end **122*a***.

The pump body 121 can further include fastener receivers 168 for receiving fasteners, by way of non-limiting example screws 169 (FIG. 7) when assembling the pump assembly 20 described herein.

Figure 5:
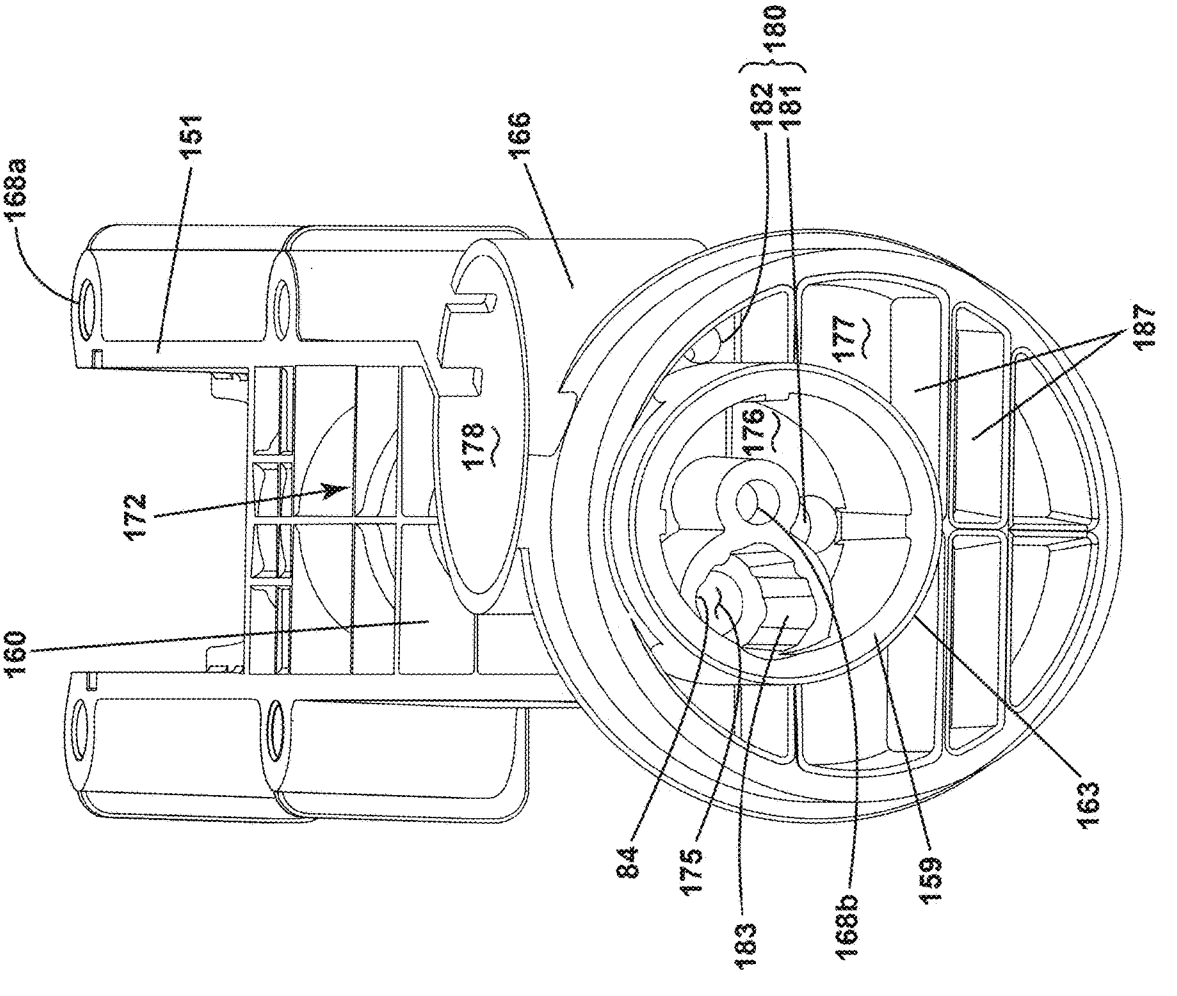
FIG. 5 is a perspective side view of the pump body from FIG. 4.

FIG. 5 is a perspective side view of the pump body 121 looking at the first end **122*a*. It can more clearly be seen that the exterior wall 158 and the interior wall 159 are circular in shape. A set of baffles 187 can extend across the inlet reservoir 177 and connect opposing sides of the exterior wall 158. A set of apertures 180 is provided in the end wall 162 and includes a bypass aperture 181 and an inlet aperture 182. The inlet aperture 182 is located within the inlet reservoir 177**.

The bypass aperture 181 is located within the outlet reservoir 176. A first check valve opening 183 also extends through the end wall 162. The check valve conduit 175 extends from the first check valve opening 183 to a second check valve opening 184 fluidly coupled to the transfer conduit 172. Another fastener receiver **168*b* extends from the end wall 162 into the outlet reservoir 176**.

Figure 6:
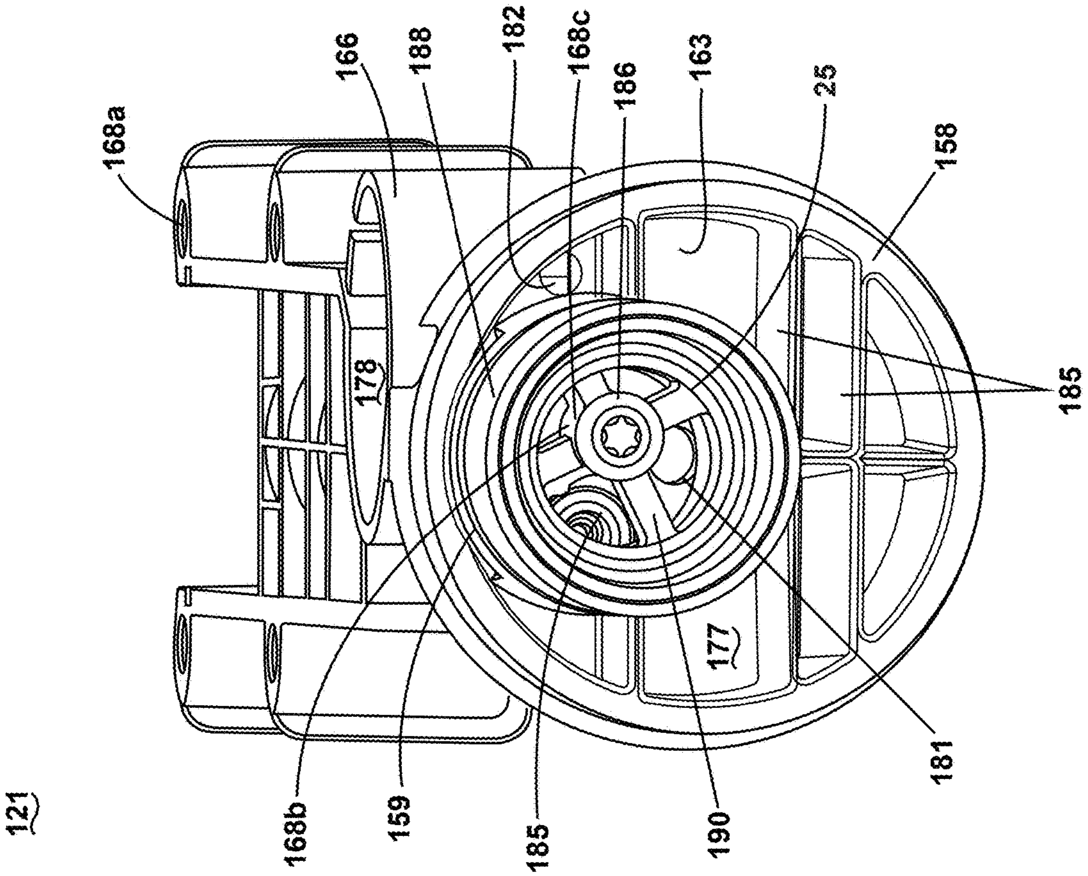
FIG. 6 is a cross-sectional view of a portion of the securement device 10 taken along line VI-VI of FIG. 2 including a pressure relief valve and a tube cap.

FIG. 6 is a cross-sectional view taken along line VI-VI of FIG. 2 looking at the first end **122*a* with a check valve 185 and a tube cap 25. The check valve 185 is located in the first check valve opening 183 (FIG. 5). The tube cap 25 is formed to fit into the outlet reservoir 176 (FIG. 5) defined by the interior wall 159 (FIG. 5). The tube cap 25 includes another fastener receiver 168*c* that aligns with the fastener receiver 168*b*. A fastener 186 can be received through the fastener receivers 168*b*, 168*c* to mount the tube cap 25 to the pump body 121. A set of spokes 190 can extend from the fastener receiver 168 and hold the check valve 185**.

FIG. 7 is an exploded view of the pump assembly 20, the bladder assembly 30, and the rod assembly 40 according to an aspect of the disclosure herein. The pump assembly 20 includes the pump body 121 of FIGS. 4, 5, and 6. The handle 15 can be mounted to the pump body 121 with screws 169 received in the fastener receivers 168. Some reference numerals have been removed from the pump body 121 for clarity.

The rod assembly 40 further includes an end seal 45 and a rod seal 46. A floating piston assembly 47 is configured to contact the rod seal 46. The floating piston assembly 47 includes a male end 48, a female end 49, and a first quad seal **26*a*. When assembled, the end seal 45 sits within the primary bar 12 (FIG. 1) to anchor the pump assembly 20** in place.

The bladder assembly 30 further includes a tube 33 with a cylindrical shape smaller in diameter than the bladder 31. The tube 33 is receivable in the bladder 31. A bladder plug 34 defines the first end **32*a* of the bladder assembly 30. The bladder plug 34 is clamped to the bladder 31 with a first clamp 35*a*. A second clamp 35*b* defines a portion of the second end 32*b* of the bladder assembly 30**.

The pump assembly 20 further includes the tube cap 25. The tube cap 25 includes a second quad seal **26*b*. A piston 27 is configured to be received in the piston housing 171. A pressure relief control valve (PRCV) 28 is housed in the second section 172*b* of the transfer conduit 172 between the intermediate wall 166 and a first end 29 of the piston 27. The piston cap 24 closes the piston 27 within the pump body 121. The piston cap 24 is to prevent dust and other contaminants from getting into the area where the piston 27** slides.

Figure 8:
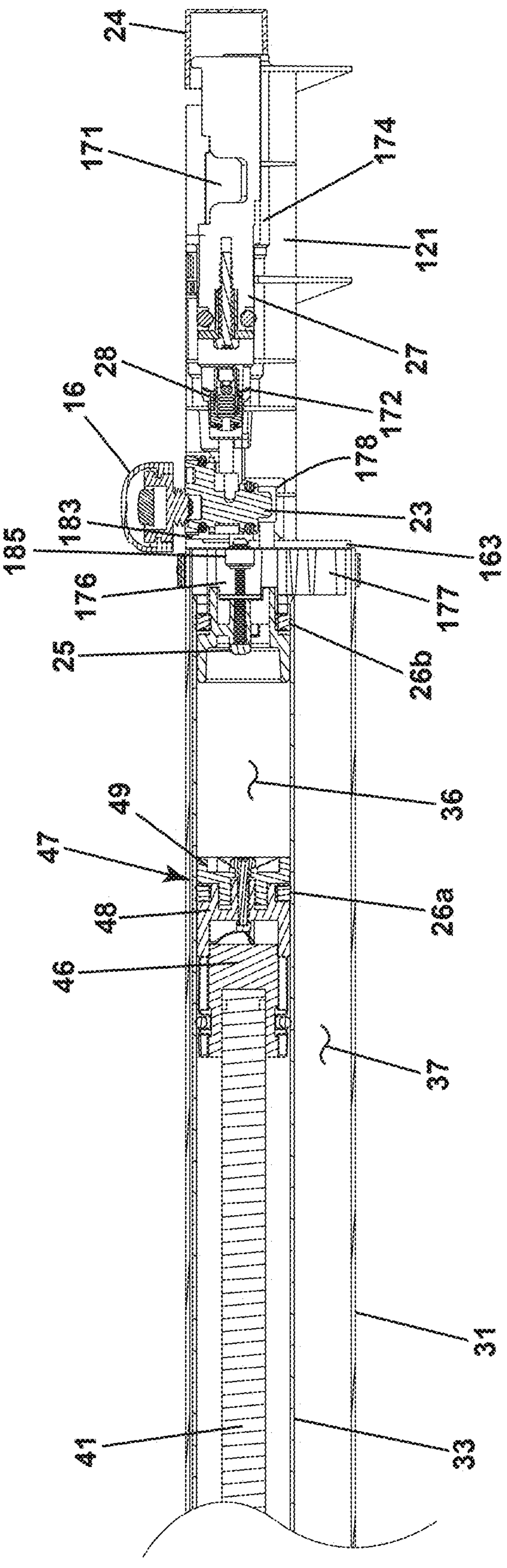
FIG. 8 is a cross-sectional view of an assembled portion of the securement device of FIG. 1 taken along line VIII-VIII of FIG. 2.

FIG. 8 is a cross-sectional view of a portion of the securement device 10 taken along line VIII-VIII of FIG. 2 and including the pump body 121. The first check valve opening 183 extends from the outlet reservoir 176 through the end wall 162 into the intermediate chamber 178. The check valve 185 is located in the first check valve opening 183.

A fluid chamber 36 is defined at least in part by the tube 33. The fluid chamber 36 is further defined by the floating piston assembly 47 and the tube cap 25. The fluid chamber 36 is sealed with the first and second quad seals **26*a*, 26*b***.

A fluid reservoir 37 is defined at least in part by the tube 33 and the bladder 31. The fluid reservoir 37 is further defined by the end wall 162 and in fluid communication with the inlet reservoir 177.

Figure 9:
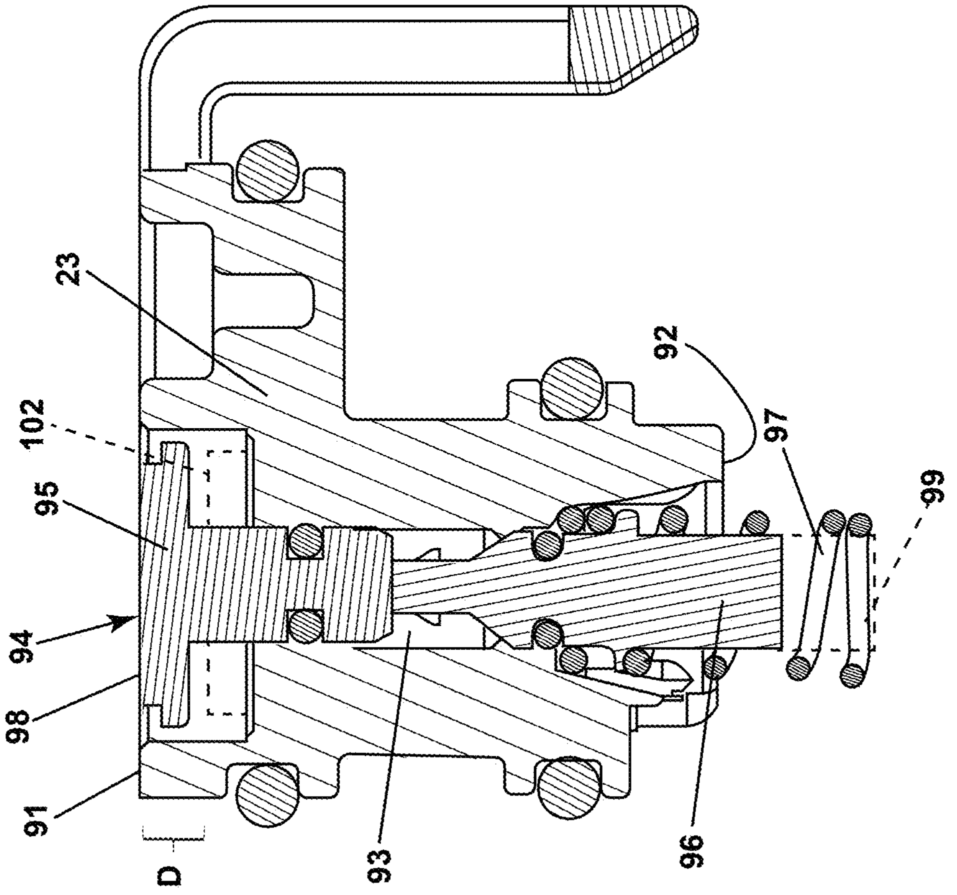
FIG. 9 is a cross-sectional view of pressure relief valve for the securement device of FIG. 1 taken along line IX-IX of FIG. 7.

FIG. 9 is a cross-sectional view of the pressure relief valve assembly 23 taken along line IX-IX of FIG. 7. The pressure relief valve assembly 23 extends between a top 91 and a bottom 92. A plunger conduit 93 extends through the pressure relief valve assembly 23 from the top 91 through the bottom 92. A plunger 94 includes a top portion 95 and bottom portion 96. A compression spring 97 is located in the plunger conduit 93 at the bottom 92. When assembled the compression spring 97 sits in the spring hole 188 at the bottom 189 of the intermediate chamber 178 (FIG. 8). The plunger 94 is depressible a distance D between a first position 98 (illustrated) and a second position 99 (in dashed line).

Figures 10, 11, 12:
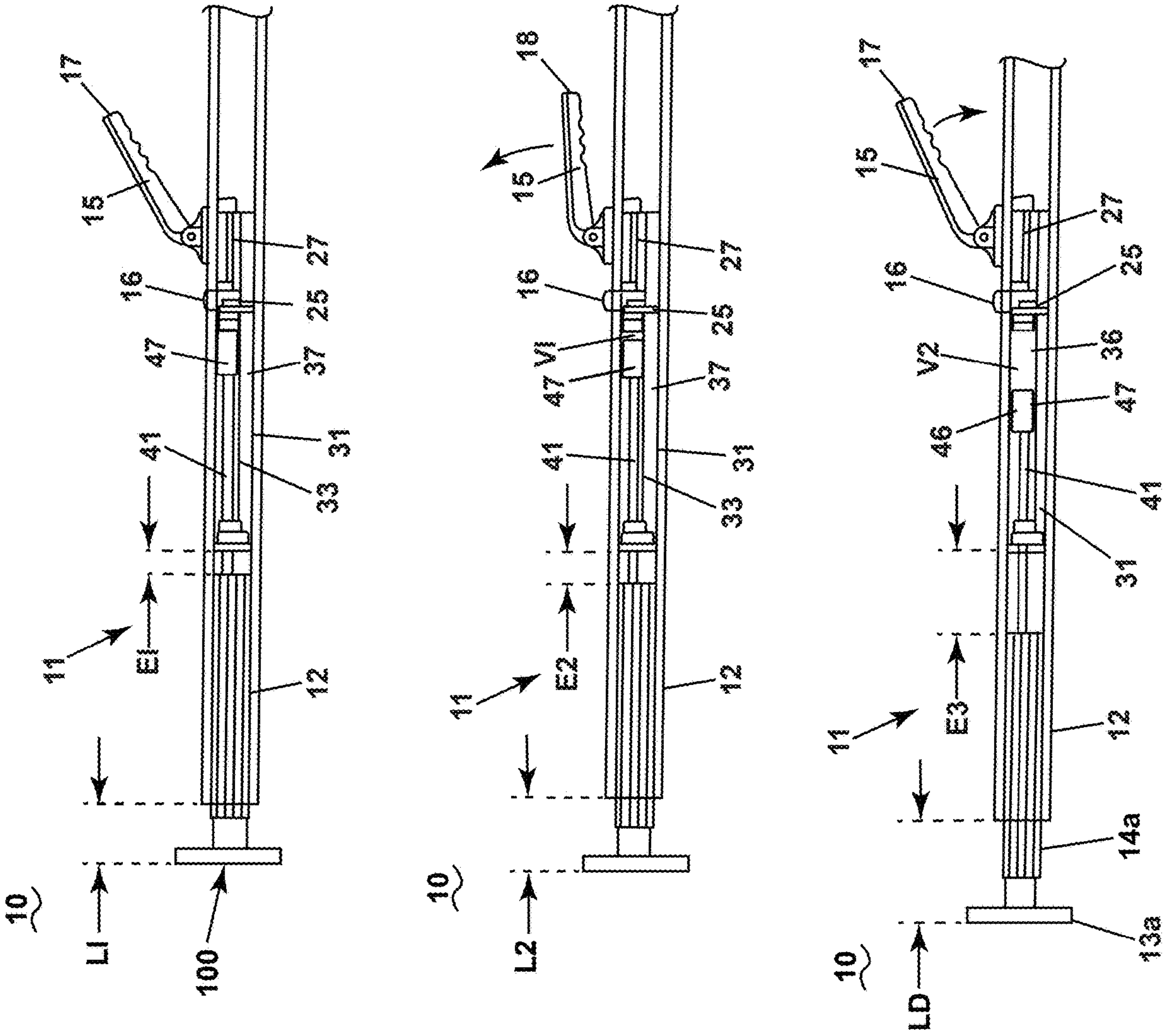
FIG. 10 illustrates the securement device in a starting position.
FIG. 11 illustrates the securement device in an intermediate position.
FIG. 12 illustrates the securement device in a desirable position.

FIGS. 10-12 illustrate the securement device in operation. FIG. 10 shows the first extension bar 14*a* extending out from the primary bar 12 a first length (denoted "L1") to define a starting position 100. In the starting position 100, a majority of the rod 41 is located within the tube 33, leaving a first extended portion (denoted "E1") within the primary bar 12. Further, the tube cap 25 and the floating piston assembly 47 are in contact with each other. By moving the handle into an up position 17 the piston 27 moves to draw fluid from the fluid reservoir 37 along the first flow path F1 (FIG. 3).

By moving the handle into a down position 18 the piston 27 moves to push fluid into the tube 33 along the second flow path F2 (FIG. 3). This moves the floating piston assembly 47 to define a first volume (denoted "V1") in the fluid chamber 36. Consequently, the rod 41 is pushed out into the primary bar 12 to define a second extended portion (denoted "E2"). The spring damper 43 (FIG. 2) pushes on the compression spring 44 (FIG. 2) which in turn moves the first extension bar 14*a* further out of the primary bar 12 to a second length (denoted "L2").

A user can repeat the moves illustrated in FIGS. 10 and 11 until a desired length (denoted "LD") is achieved as illustrated in FIG. 12. When the pressure within the fluid chamber 36 reaches a predetermined limit, the PRCV 28 causes fluid to flow back along flow path F3 (FIG. 3) into the fluid reservoir 37 rather than into the fluid chamber 36. In some implementations the PRCV 28 makes an audible sound as the fluid rushes past the PRCV 28 and back into the fluid reservoir 37 to ensure a user refrains from moving the handle 15 anymore. The predetermined pressure is determined by a type of compression spring (not illustrated) utilized within the PRCV 28 during the manufacturing process. By way of non-limiting example, the compression spring has a force limit of 300 lbf (1335N). Other force limits are contemplated depending on the application of the securement device 10.

When the securement device 10 is finished being used and it is desired to return to the starting position, depressing the button 16 will cause the PRV 23 to open the flow path F4 and drain the fluid from the fluid chamber 36 back into the fluid reservoir 37. This pressure release enables movement of the first extension bar 14*a* back into the primary bar 12.

Figure 13:
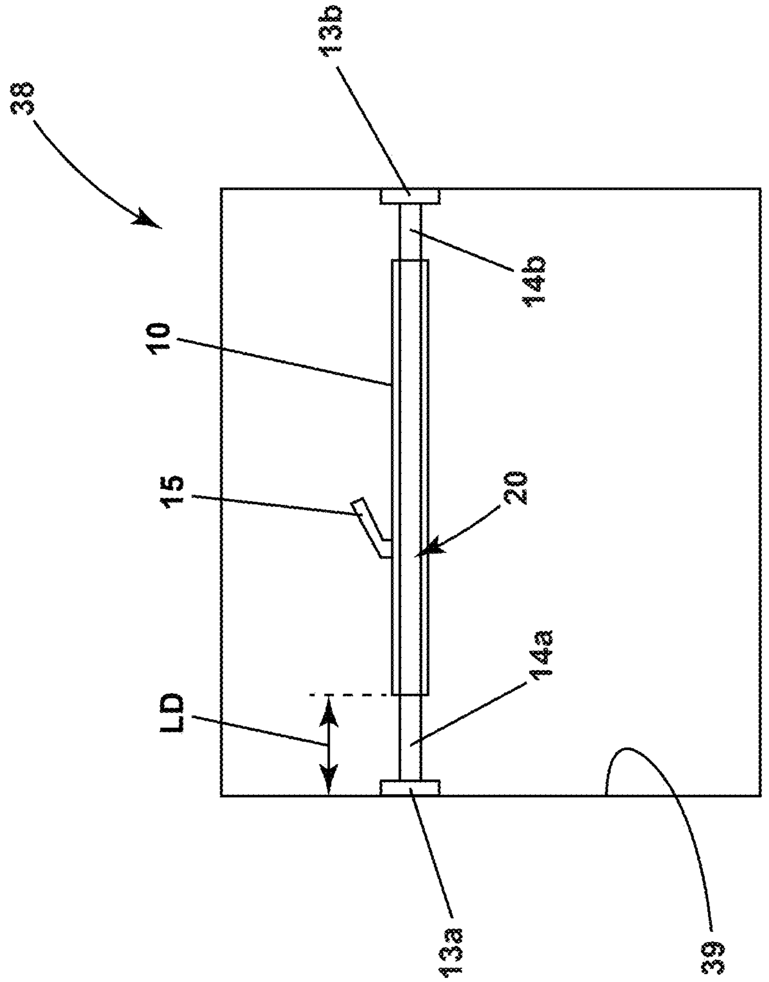
FIG. 13 is a schematic illustrating the back of a trailer and the securement device in place.

FIG. 13 is a schematic of the securement device 10 in a trailer 38. During operation the PRCV 28 ensures that the feet 13*a*, 13*b* do not exert too much pressure on walls 39 of the trailer 38. As previously described herein, first the securement device 10 is adjusted to fit longitudinally between the walls 39 by manually adjusting the second extension bar 14*b* to fit the space between the walls 39. Then the pump assembly 20 is utilized to extend the first extension bar 14*a* to the desired length LD for a snug fit between the walls 39 of the trailer 38. While illustrated as horizontally mounted, it should be understood that the securement device 10 can be vertically placed as well.

Benefits associated with the securement device described herein include consistent use and repeatability. By utilizing the bladder assembly described herein along with the singular one-piece pump body, assembly is simplified.

To the extent not already described, the different features and structures of the various aspects can be used in combination, or in substitution with each other as desired. That one feature is not illustrated in all of the examples is not meant to be construed that it cannot be so illustrated, but is done for brevity of description. Thus, the various features of the different aspects can be mixed and matched as desired to form new aspects, whether or not the new aspects are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspect are provided by the subject matter of the following clauses:

A securement device comprising a primary bar; at least one extension bar located within and coaxial with the primary bar; a bladder assembly located within the primary bar and comprising a fluid chamber and a fluid reservoir; a rod assembly comprising a rod terminating in a seal at a first rod end and coupled to the at least one extension bar at a second rod end, the seal moveable within the fluid chamber; a pump assembly comprising: a pump body extending axially between a body first end and a body second end to define a centerline, the pump body defining a piston chamber terminating in the second end; a piston moveable within the piston chamber; a check valve located at the first end, the check valve selectively fluidly coupling the piston chamber to the fluid chamber; and an inlet located at the first end, the inlet fluidly coupling the fluid reservoir to the piston chamber.

The securement device of any preceding clause, wherein the piston chamber further comprises a transfer conduit extending between the first end and an aperture.

The securement device of any preceding clause, further comprising a piston housing extending from the aperture to the second end.

The securement device of any preceding clause, wherein the piston is moveable through the aperture.

The securement device of any preceding clause, wherein the transfer conduit comprises a decreasing diameter with respect to the centerline and in a direction from the aperture toward the check valve.

The securement device of any preceding clause, wherein the pump body further comprises an intermediate chamber fluidly coupled to the inlet.

The securement device of any preceding clause, further comprising a pressure relief valve coupled to the intermediate chamber and moveable between a relief position and a hold position.

The securement device of any preceding clause, further comprising a bypass channel fluidly coupling the fluid chamber to the fluid reservoir via the intermediate chamber when the pressure relief valve is in the relief position.

The securement device of any preceding clause, wherein together the inlet, the intermediate chamber, the transfer conduit, and the check valve define a fluid passageway from the fluid reservoir to the fluid chamber when the pressure relief valve is in the hold position.

The securement device of any preceding clause, further comprising a cap coupled to pump body at the first end, comprising at least one bar for holding the check valve, and defining an outlet of the fluid passageway.

The securement device of any preceding clause, wherein the bladder assembly further comprises an exterior tube at least partially defining the fluid reservoir.

The securement device of any preceding clause, further comprising an interior tube located within the exterior tube, the interior tube defining the fluid chamber.

The securement device of any preceding clause, further comprising a cap coupling the interior tube to the first end of the pump body and defining an outlet fluidly coupling the fluid chamber to the piston chamber via the check valve.

The securement device of any preceding clause, further comprising a pressure relief control valve in the piston chamber.

A method of securing a cargo load with a securement device, the method comprising: flowing a fluid along a first flow path from a fluid reservoir of a bladder assembly along a first flow path into a piston chamber of a pump body; flowing the fluid along a second flow path from the piston chamber into a fluid chamber of the bladder assembly; moving a floating piston assembly within the fluid chamber with the fluid; contacting a rod with the floating piston assembly to push the rod out of the bladder assembly; and pushing an extension bar out of a primary bar of the securement device with a spring damper mounted to the rod.

The method of any preceding clause, further comprising flowing the fluid from the piston chamber into an intermediate chamber of the pump body when pressure within the fluid chamber reaches a predetermined limit.

The method of any preceding clause, further comprising blocking the second flow path with a pressure relief control valve.

The method of any preceding clause, further comprising pushing the extension bar out of the primary bar until the extension bar reaches a desired length.

The method of any preceding clause, further comprising flowing the fluid along a fourth flow path extending from the fluid chamber through an intermediate chamber of the pump body and into the fluid reservoir with a pressure relief valve.

The method of any preceding clause, further comprising flowing the fluid along the first flow path from the fluid reservoir through an inlet reservoir of the pump body into an intermediate chamber of the pump body and into a transfer conduit of the piston chamber.

The method of any preceding clause, further comprising flowing the fluid along the second flow path from the transfer conduit into a check valve conduit of the pump body through an outlet reservoir of the pump body and into the fluid chamber.

A hydraulic pump assembly comprising: a pump body extending between a first end and a second end to define a longitudinal direction, the pump body defining a centerline, the pump body comprising: a set of longitudinal walls extending in the longitudinal direction parallel to the centerline, the set of longitudinal walls including an interior wall and an exterior wall surrounding the interior wall; a set of transverse walls intersecting the set of longitudinal walls and extending perpendicular to the centerline to define a transverse direction, the set of transverse walls separating the pump body into multiple chambers defined at least in part by the set of longitudinal walls, the set of transverse walls including an end wall; a set of chambers defined at least in part by the set of longitudinal walls and the set of transverse walls, the set of chambers comprising: an inlet reservoir defined at least in part by the exterior wall and the end wall; an outlet reservoir defined at least in part by the interior wall and the end wall; an intermediate wall extending radially from the centerline and intersecting the end wall and at least one of the set of longitudinal walls, the intermediate wall defining an intermediate chamber; and a set of apertures located in the end wall and fluidly coupling the intermediate chamber to the inlet reservoir and to the outlet reservoir.

The hydraulic pump assembly of any preceding clause, wherein the set of apertures comprises a bypass aperture fluidly coupling the intermediate chamber to the outlet reservoir.

The hydraulic pump assembly of any preceding clause, wherein the set of apertures further comprises an inlet aperture fluidly coupling the intermediate chamber to the inlet reservoir.

The hydraulic pump assembly of any preceding clause, wherein the set of longitudinal walls comprises a first wall, a second wall, and a base wall terminating at the body second end and together defining at least a portion of a piston chamber.

The hydraulic pump assembly of any preceding clause, wherein the set of transverse walls comprises a third wall separating the piston chamber into a piston housing and a transfer conduit.

The hydraulic pump assembly of any preceding clause, further comprising a piston moveable within the piston housing and the transfer conduit.

The hydraulic pump assembly of any preceding clause, wherein the set of longitudinal walls further comprises a transfer wall extending from the third wall to the intermediate wall to define the transfer conduit.

The hydraulic pump assembly of any preceding clause, further comprising a first transfer opening extending through the third wall and a second transfer opening extending through the intermediate wall, wherein the transfer conduit extends from the first transfer opening to the second transfer opening.

The hydraulic pump assembly of any preceding clause, wherein the transfer wall defines a cross-sectional area of the transfer conduit, and the cross-sectional area decreases in the longitudinal direction from the first transfer opening toward the second transfer opening.

The hydraulic pump assembly of any preceding clause, further comprising a check valve opening extending through the end wall and a check valve conduit extending from the check valve opening to the transfer conduit, the check valve conduit fluidly coupling the transfer conduit to the outlet reservoir.

The hydraulic pump assembly of any preceding clause, further comprising a check valve located in the check valve opening to selectively fluidly couple the check valve conduit to the outlet reservoir.

The hydraulic pump assembly of any preceding clause, further comprising a pressure relief valve located within the intermediate chamber and moveable between a relief position and a hold position.

The hydraulic pump assembly of any preceding clause, wherein when the pressure relief valve is in the relief position, the intermediate chamber is fluidly coupled to the outlet reservoir via the set of apertures.

The hydraulic pump assembly of any preceding clause, wherein when the pressure relief valve is in the hold position, the intermediate chamber is fluidly coupled to the inlet reservoir via the set of apertures.

The hydraulic pump assembly of any preceding clause, further comprising a bladder assembly with an exterior tube and an interior tube located within the exterior tube, the exterior tube at least partially defining a fluid reservoir fluidly coupled to the inlet reservoir, and the interior tube at least partially defining a fluid chamber fluidly coupled to the outlet reservoir.

The hydraulic pump assembly of any preceding clause, further comprising a cap coupling the interior tube to the interior wall and further defining the outlet reservoir.

The hydraulic pump assembly of any preceding clause, further comprising a pressure relief control valve in the piston chamber.

The invention claimed is:

1. A securement device comprising:

a primary bar;

at least one extension bar located within and coaxial with the primary bar;

a bladder assembly located within the primary bar and comprising a fluid chamber and a fluid reservoir;

a rod assembly comprising a rod terminating in a seal at a first rod end and coupled to the at least one extension bar at a second rod end, the seal moveable within the fluid chamber;

a pump assembly comprising:

a pump body extending axially between a first end and a second end to define a centerline, the pump body defining a piston chamber terminating in the second end;

a piston moveable within the piston chamber;

a check valve located at the first end of the pump body, the check valve selectively fluidly coupling the piston chamber to the fluid chamber; and an inlet located at the first end of the pump body, the inlet fluidly coupling the fluid reservoir to the piston chamber, wherein the piston chamber further comprises a transfer conduit extending between the first end of the pump body and an aperture, a piston housing extending from the aperture to the second end of the pump body, wherein the piston is moveable through the aperture;

wherein the inlet comprises a transfer conduit having a decreasing diameter with respect to the centerline and in a direction from the aperture toward the check valve.

2. The securement device of claim 1, wherein the pump body further comprises an intermediate chamber fluidly coupled to the inlet.

3. The securement device of claim 2, further comprising a pressure relief valve coupled to the intermediate chamber and moveable between a relief position and a hold position.

4. The securement device of claim 3, further comprising a bypass channel fluidly coupling the fluid chamber to the fluid reservoir via the intermediate chamber when the pressure relief valve is in the relief position.

5. The securement device of claim 3, wherein together the inlet, the intermediate chamber, the transfer conduit, and the check valve define a fluid passageway from the fluid reservoir to the fluid chamber when the pressure relief valve is in the hold position.

6. The securement device of claim 5, further comprising a cap coupled to the pump body at the first end of the pump body, comprising at least one bar for holding the check valve, and defining an outlet of the fluid passageway.

7. The securement device of claim 1, wherein the bladder assembly further comprises an exterior tube at least partially defining the fluid reservoir.

8. The securement device of claim 7, further comprising an interior tube located within the exterior tube, the interior tube defining the fluid chamber.

9. The securement device of claim 8, further comprising a cap coupling the interior tube to the first end of the pump body and defining an outlet fluidly coupling the fluid chamber to the piston chamber via the check valve.

10. The securement device of claim 1, further comprising a pressure relief control valve in the piston chamber.

11. The securement device of claim 1, wherein the pump body comprises a set of chambers comprising: an inlet reservoir defined at least in part by an exterior wall and an end wall of the pump body, an outlet reservoir defined at least in part by an interior wall and the end wall of the pump body, an intermediate wall defining an intermediate chamber.

12. The securement device of claim 11, wherein the pump body further comprises a check valve conduit extending between a first check valve opening at the end wall of the pump body and a second check valve opening fluidly coupled to the transfer conduit, and a bypass aperture located to fluidly couple the outlet reservoir to the intermediate chamber.

13. The securement device of claim 12, further comprising a check valve opening extending through the end wall of the pump body and a check valve conduit extending from the check valve opening to the transfer conduit, the check valve conduit fluidly coupling the transfer conduit to the outlet reservoir.

14. The securement device of claim 13, further comprising a check valve located in the check valve opening to selectively fluidly couple the check valve conduit to the outlet reservoir.

* * * * *